(12) United States Patent
Smith

(10) Patent No.: US 9,900,754 B2
(45) Date of Patent: *Feb. 20, 2018

(54) WIRELESS INTERNET GATEWAY LIMITING MESSAGE DISTRIBUTION

(71) Applicant: TeleCommunication Systems, Inc., Annapolis, MD (US)

(72) Inventor: Richard A. Smith, Annapolis, MD (US)

(73) Assignee: Telecommunication Systems, Inc., Annapolis, MD (US)

( * ) Notice: Subject to any disclaimer, the term of this patent is extended or adjusted under 35 U.S.C. 154(b) by 338 days.

This patent is subject to a terminal disclaimer.

(21) Appl. No.: 14/854,401

(22) Filed: Sep. 15, 2015

(65) Prior Publication Data
US 2016/0014575 A1     Jan. 14, 2016

Related U.S. Application Data

(60) Continuation of application No. 14/515,655, filed on Oct. 16, 2014, now Pat. No. 9,172,821, which is a
(Continued)

(51) Int. Cl.
*G06F 15/173*     (2006.01)
*H04W 4/14*     (2009.01)
(Continued)

(52) U.S. Cl.
CPC .............. *H04W 4/14* (2013.01); *H04L 63/105* (2013.01); *H04L 67/04* (2013.01); *H04L 67/28* (2013.01);
(Continued)

(58) Field of Classification Search
USPC ................ 709/220, 221, 222, 223, 225, 232
See application file for complete search history.

(56) References Cited

U.S. PATENT DOCUMENTS 5,410,598 A * 4/1995 Shear .................. G06F 12/1408
                                                                                                    327/525
6,131,024 A * 10/2000 Boltz .................... H04M 15/88
                                                                                                   455/405

(Continued)

*Primary Examiner* — Liangche A Wang
(74) *Attorney, Agent, or Firm* — Tarolli, Sundheim, Covell & Tummino LLP

(57) ABSTRACT

A wireless Internet gateway bridges wireless devices to the Internet, e.g., via a short message service center (SMSC). The gateway provides a portal to SMPP, HTTP, TNPP, or other protocol messages using Java Remote Method Invocation (RMI) techniques. Application servers insert RMI objects containing messages in a message queue handler of the gateway. The RMI objects are queued and passed either directly to a destination delivery handler (e.g., SMPP, SMTP, HTTP or TNPP protocol handler), or passed through a generic destination interface. An SMTP handler provides direct communication of SMTP protocol messages (i.e., email) to the message queue. An SMPP link proxy module provides direct access between a local application server and the destination delivery handler. The messages are packaged into relevant messages of the particular destination protocol (e.g., SMPP), and transmitted to the relevant network element (e.g., to an SMSC).

9 Claims, 16 Drawing Sheets

Related U.S. Application Data continuation of application No. 12/929,311, filed on Jan. 13, 2011, now abandoned, which is a division of application No. 11/700,894, filed on Feb. 1, 2007, now Pat. No. 7,949,773, which is a division of application No. 09/630,762, filed on Aug. 2, 2000, now Pat. No. 7,228,333.

(60) Provisional application No. 60/199,367, filed on Apr. 25, 2000.

(51) Int. Cl.
| | | |
|---|---|---|
| *H04W 4/12* | (2009.01) | |
| *H04W 12/08* | (2009.01) | |
| *H04L 29/08* | (2006.01) | |
| *H04M 15/00* | (2006.01) | |
| *H04L 29/06* | (2006.01) | |
| *H04W 88/16* | (2009.01) | |

(52) U.S. Cl.
CPC ...... *H04L 67/2823* (2013.01); *H04L 67/2842* (2013.01); *H04M 15/61* (2013.01); *H04W 4/12* (2013.01); *H04W 12/08* (2013.01); *H04L 63/0428* (2013.01); *H04L 67/40* (2013.01); *H04L 69/08* (2013.01); *H04W 88/16* (2013.01)

(56) References Cited

U.S. PATENT DOCUMENTS

| | | | | |
|---|---|---|---|---|
| 6,175,922 B1* | 1/2001 | Wang | ...................... | G06Q 20/02 380/255 |
| 6,244,758 B1* | 6/2001 | Solymar | ................ | G06F 21/313 709/200 |
| 6,301,695 B1* | 10/2001 | Burnham | ............ | G06F 17/5054 713/1 |
| 6,421,733 B1* | 7/2002 | Tso | .................... | G06F 17/30905 358/402 |
| 6,430,540 B1* | 8/2002 | Guidice | ............... | G06Q 10/087 705/28 |
| 6,487,180 B1* | 11/2002 | Borgstahl | .............. | G06Q 10/02 370/259 |
| 6,567,979 B1* | 5/2003 | deCarmo | ............... | H04N 7/173 348/E7.069 |
| 6,850,916 B1* | 2/2005 | Wang | .................... | G06F 21/606 235/379 |
| 7,069,439 B1* | 6/2006 | Chen | ....................... | G06F 21/34 380/251 |

* cited by examiner

WIRELESS INTERNET GATEWAY LIMITING MESSAGE DISTRIBUTION

This application is a continuation of U.S. application Ser. No. 14/515,655, to SMITH, entitled "Wireless Internet Gateway Limited Message Distribution" filed on Oct. 16, 2014; is a continuation of U.S. application Ser. No. 12/929,311, to SMITH, entitled "Wireless Internet Gateway Limiting Message Distribution" filed on Jan. 13, 2011, now abandoned; which is a divisional of U.S. application Ser. No. 11/700,884, to SMITH, entitled "Wireless Internet Gateway", filed on Feb. 1, 2007; which in turn is a divisional of U.S. application Ser. No. 09/630,762, to SMITH, entitled "Wireless Internet Gateway", filed on Aug. 2, 2000, now U.S. Pat. No. 7,228,333; which in turn claims priority from U.S. Provisional Appl. No. 60/196,367, to SMITH, entitled "Wireless Internet Gateway", filed on Apr. 25, 2000, the entireties of all of which are expressly incorporated herein by reference.

BACKGROUND OF THE INVENTION

1. Field of the Invention

This invention relates generally to wireless carriers, Internet service providers (ISPs), and information content delivery services/providers. More particularly, it relates to wireless telecommunications and wireless portals for routing messages from mobile devices to Internet destinations.

2. Background of Related Art

Short Message Service Centers (SMSCs) deliver short messages through a wireless network. Typically they operate on highly valuable server platforms that are protected deep within a wireless carrier's network, and communicate via specialized protocols.

FIG. 11 shows a conventional gateway providing Internet access to a wireless network through a short message service center (SMSC).

In particular, as shown in FIG. 11, a gateway 900 translates between HTTP protocol messages from the Internet 190 and SMPP protocol messages to wireless devices in a wireless network 130 via an SMSC 120.

The gateway 900 provides a portal between wireless networks and the Internet 190. However, conventional portals between wireless networks and the Internet generally utilize either a proprietary operating system, or are developed to operate on a single operating system, e.g., WINDOWS NT™ or SOLARIS™. Moreover, conventional gateway 900 architecture provides a communication path between fixed protocol types, e.g., between HTTP protocol messages and SMPP protocol messages. Separate gateway application programming interfaces (APIs) are developed to communicate with other protocol types. For instance, to allow communications between an application server on the Internet using HTTP protocol messages and a paging terminal using TNPP protocol messages, a new gateway API must be developed from point-to-point from the HTTP interface to the TNPP interface. This presents a tremendous amount of development work necessary to support new network elements, particularly wireless network elements.

There is thus a need for a more flexible gateway architecture and method which provides interface capability without the need for the total redevelopment of separate gateways to support different types of message protocols.

BRIEF DESCRIPTION OF THE DRAWINGS

Features and advantages of the present invention will become apparent to those skilled in the art from the following description with reference to the drawings, in which:

FIG. 9B illustrates how messages would flow in an SMTP environment.

FIG. 9C illustrates how messages would flow in an RMI scenario.

DETAILED DESCRIPTION OF ILLUSTRATIVE EMBODIMENTS

Figure 1:
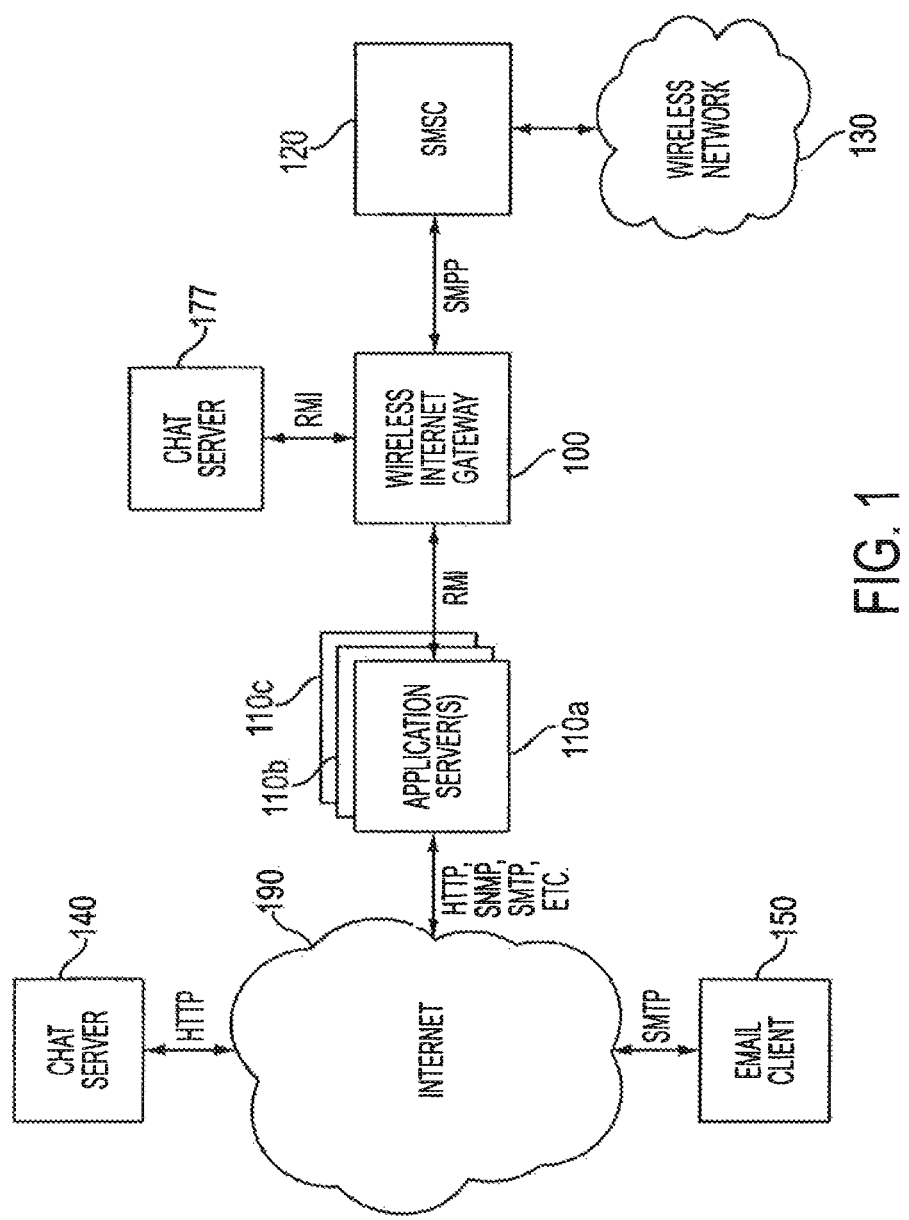
FIG. 1 shows exemplary connectivity for a wireless Internet gateway, in accordance with the principles of the present invention.

The present invention provides a wireless Internet gateway which bridges the gap between the Internet and wireless devices, e.g., via a short message service center (SMSC). The disclosed architecture is modular, and provides a generic destination interface to any of a plurality of destination devices of any of a variety of protocols. This reduces redevelopment efforts to those required only between the generic destination interface and the particular destination device, eliminating the need for redevelopment of the application programming interface (API) up to the generic destination interface.

In a particular disclosed embodiment the wireless Internet gateway provides a portal to SMPP protocol messages using RMI techniques. However, the present invention has applicability to portals or gateways providing a communication path between RMI objects and any other type of wireless network messaging protocol.

The disclosed embodiment of a wireless Internet gateway in accordance with the principles of the present invention receives SMPP messages on a wireless network side, translates those SMPP messages to RMI message objects, and re-transmits those RMI message objects to an application server having access to the Internet (or Intranet) (e.g., to an E-mail server, a chat server, voice messaging system, paging system, etc.). The wireless Internet gateway utilizes common protocols (e.g., SMPP) to allow operation with existing standard conforming wireless networks.

In particular, the disclosed wireless Internet gateway is provided between the Internet using, e.g., HTTP protocols and a Short Message Service Center (SMSC) which communicates with wireless handsets over a wireless network using, e.g., SMPP protocols.

Importantly, the wireless Internet gateway uses Java Remote Method Invocation (RMI) techniques to communicate with relevant application servers using other transmission protocols of the Internet (or Intranet) (e.g., HTTP, SMTP relating to e-mail messages, etc.). The RMI techniques insert RMI message objects in the wireless Internet gateway, which are communicated to a generic destination interface. From the generic destination interface the messages are packaged into relevant messages of the particular destination protocol (e.g., SMPP), and transmitted to the relevant network element (e.g., to an SMSC).

A wireless Internet gateway in accordance with the principles of the present invention effectively provides a shield for a wireless provider's short message service center (SMSC) from direct interaction with Internet clients. This provides a more secure environment from the perspective of the wireless provider, and allows the wireless provider the freedom to implement Internet access for wireless subscribers using existing otherwise non-Internet ready SMSCs.

The disclosed wireless Internet gateway is flexible in that it is easily developed to support any input protocol (using RMI techniques with a relevant application server providing the particular input protocol), and any output protocol developed to package messages from RMI message objects passed to a generic destination interface into the particular output protocol.

The standard protocol commands utilized by the disclosed wireless Internet gateway can be extended or added to software already existing in an SMSC or other appropriate element of a wireless system through the addition of an appropriate Application Programming Interface (API). Moreover, the wireless Internet gateway can serve as a messaging middleware layer for other applications.

The wireless Internet gateway preferably is implemented so as to be capable of operating on a number of different platforms. One way of accomplishing this is by using software written in the Java programming language. In this way, any operating system or hardware platform that supports the Java run time environment can be used to support a wireless Internet gateway application. For instance, a wireless Internet gateway application written in Java may be implemented on most operating systems, including Linux, HP-UX, Netware, Solaris (Intel and Sparc), and NT.

An important feature of the present invention is the use of Java Remote Method Invocation (RMI) technology to provide an interface to other application servers, which in turn communicate over the Internet. In this way, application servers on the Internet are responsible for communicating over the Internet using other protocols (e.g., HTTP, SNMP, SMTP, etc.), or directly with a user. These application servers on the Internet each then communicate with a wireless Internet gateway utilizing RMI techniques implemented in an appropriate gateway Application Programming Interface (API). The disclosed gateway API is a collection of Java classes and their methods which use Java Remote Method Invocation (RMI) technology to pass data between an application server in communication with the Internet and the wireless Internet gateway.

Thus, in accordance with the principles of the present invention, as long as an application server in communication with the Internet communicates with the wireless Internet gateway using RMI techniques, the application server is free to utilize any other protocol on its front end to communicate over the Internet.

FIG. 1 shows exemplary connectivity for a wireless Internet gateway, in accordance with the principles of the present invention.

In particular, as shown in FIG. 1, a wireless Internet gateway 100 together with appropriate application servers 110a, 110b, 110c bridge the gap between an off-the-shelf (OTS) short message service center (SMSC) 120 and the Internet 190.

The SMSC 120 communicates with network elements of a wireless network 130. The SMSC 120 communicates with the wireless Internet gateway 100 using standard SMPP protocol commands.

The wireless Internet gateway 100 in turn communicates with the Internet via one or more appropriate application servers 110a, 110b, 110c preferably using a Java Remote Method Invocation (RMI) technique.

The application servers 110a, 110b, 110c may utilize any appropriate front end to communicate with other servers via the Internet 190. For instance, one application server 110a may be configured to communicate over the Internet using HTTP protocols. HTTP protocols may be appropriate, e.g., when a wireless device in the wireless network 130 desires to participate in a chat group hosted by a chat server 140 in communication with the Internet 190. In such a case, the wireless Internet gateway 100 will pass SMPP protocol messages with the SMSC 120, with utilize RMI techniques with the appropriate application server 110a, and the application server 110a will translate the chat group postings into HTTP protocol messages for transmission via the Internet 190 to the chat server 140.

Similarly, another application server may be configured with an appropriate application program to provide an SMTP front end presence on the Internet 190 to the wireless Internet gateway 100. In this way, wireless devices in the wireless network 130 may send and receive E-mail using SMPP protocol messages from the wireless network 130 to the SMSC 120 and to the wireless Internet gateway 100, which are passed to the appropriate application server 110b using RMI techniques, and translated by the application server 110b to the requisite SMTP protocol messages for transmission over the Internet 190.

Other application servers 110c may provide other types of front ends in communication with the Internet 190, e.g., SNMP.

The Internet front end protocol interfaces shown in FIG. 1 as being provided by application servers 110a-110c may alternatively be integrated into the wireless Internet gateway 100. For instance, the wireless Internet gateway 100 may include appropriate application programs and interfaces to provide an SMTP interface directly to the Internet 190, avoiding the need for a separate application server 110 for that purpose.

Similarly, the wireless Internet gateway 100 may include integrated front ends for HTTP and/or SNMP protocol communication links with the Internet 190. Moreover, the wireless Internet gateway 100 may interface directly with a local chat server 177.

The wireless Internet gateway 100 may have multiple provisions in its API for relaying data to and from the wireless devices in the wireless network 130 to the application servers 100. For instance, the wireless Internet gateway 100 may implement a queuing technique that attempts guaranteed delivery to a relevant wireless device through multiple transmissions if necessary. An example of a suitable application for the queuing technique is E-mail.

Figure 2:
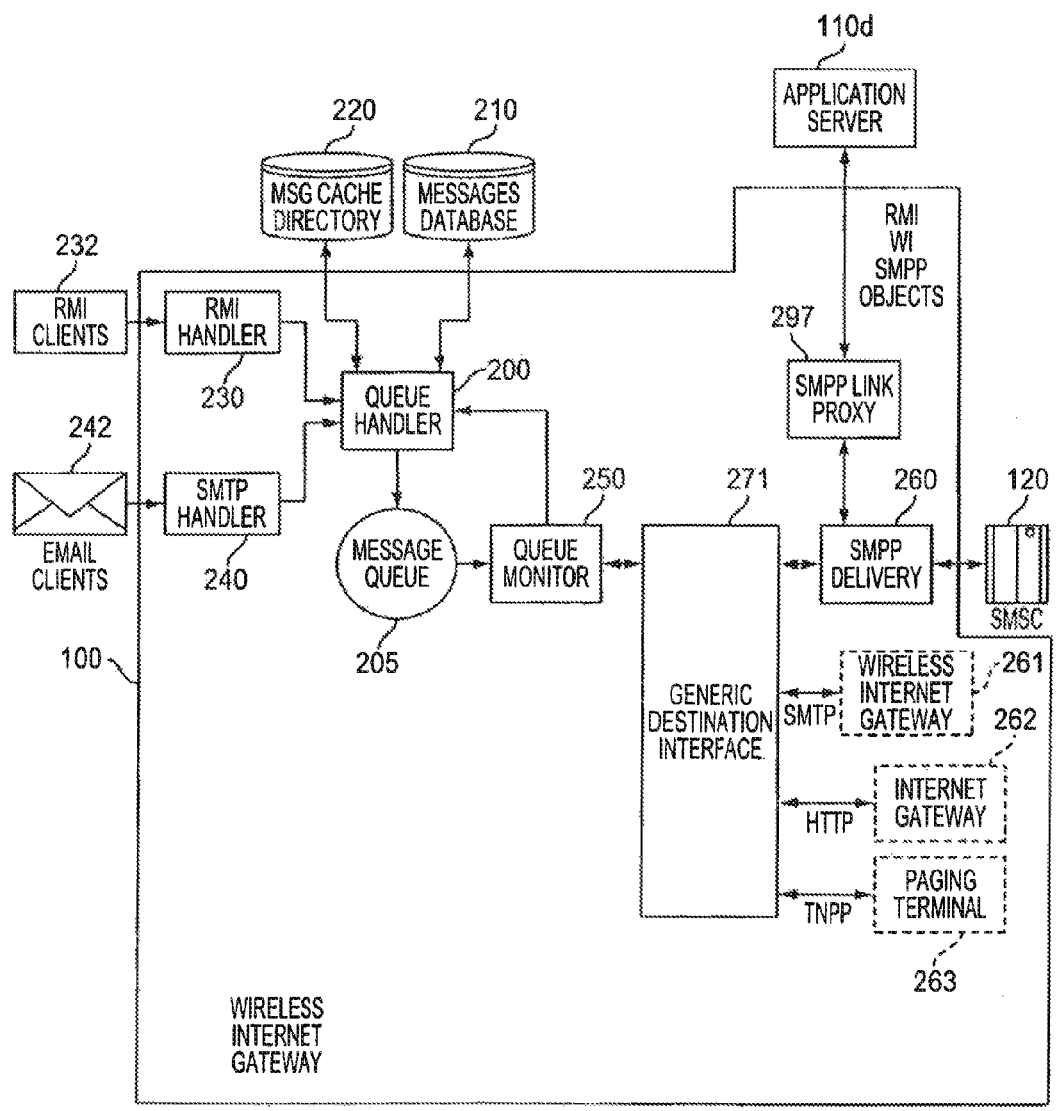
FIG. 2 shows an exemplary application programming interface (API) of a wireless Internet gateway including a short message queuing mechanism and abstracted generic destination interface, in accordance with the principles of the present invention.

FIG. 2 shows an exemplary application programming interface (API) of a wireless Internet gateway including a short message queuing mechanism and abstracted generic destination interface, in accordance with the principles of the present invention.

In particular, as shown in FIG. 2, the wireless Internet gateway 100 provides an RMI handler 230 for handling receipt of RMI objects from RMI clients 232 (i.e., application servers 110). The RMI objects are inserted into a queue handler 200 by the relevant application servers 232. Using RMI techniques, the particular front end protocol is 'abstracted' away from the wireless Internet gateway 100 API.

In addition to RMI objects, e-mail messages are processed by an SMTP handler 240 as they are received and sent to Email application servers 242

The queuing technique shown in FIG. 2 captures incoming messages into a message queue 205. The messages come from either RMI objects from the front end application servers 110, or as E-mail into a built-in mail server front end function 240 of the wireless Internet gateway 100. Thus, E-mail messages from appropriate E-mail clients 242 on the Internet 190 are received and processed by an appropriate SMTP handler 240, and passed on to a queue handler 200.

In the embodiment shown in FIG. 2, the wireless Internet gateway 100 also includes a direct SMTP connection from a local application server 110*d* provided by an SMPP link proxy module 297. The SMPP link proxy module 297 allows direct insertion and removal of SMPP formatted messages into a SMPP delivery module 260.

The integrated SMPP link proxy module 297 may communicate with the external application server 110*d* using any particular protocol. For instance, the SMPP link proxy module 297 may communicate with the external application server 110*d* using RMI techniques. Alternatively, the SMPP link proxy module 297 may communicate with the application server using, e.g., SMPP objects, etc. The application server may be, e.g., another wireless Internet gateway 100.

The SMPP link proxy module 297 is particularly useful for 'listening' to a particular port. A selected port can be monitored, and any/all messages sent to that port can be captured by the SMPP link proxy module 297, and passed to the local application server 100*d* for, e.g., printing, display, transmission via the Internet, etc.

The SMPP link proxy module 297 is optional. As shown, the SMPP link proxy module 297 provides a mechanism for messages from the wireless network 130 to be passed to a particular application server 110*d*, while the queue handler 200 is most efficient in passing messages from application servers 232 or e-mail application servers to a wireless device. However, the queue handler 200 can be implemented to handle messages in both directions to and from mobile devices.

RMI objects inserted into the queue handler 200 by the RMI handler 230 allows for a generic approach to the Internet side of the wireless Internet gateway 100 separate from the particular protocol used (e.g., HTTP), whereas the use of a direct link such as the SMPP link proxy module 297 requires particular development and dedication to a particular protocol, e.g., to SMPP as shown in FIG. 2. While RMI techniques can be utilized for multiple application servers 110 utilizing any of a number of different types of protocols on its front end, the direct technique dictates a protocol-specific implementation.

The queue handler 200 has access to a message cache directory 220, and to a messages database 210. When a message arrives its contents are stored in the message cache directory 220, and details about the message are stored in the messages database 210.

Received messages are stored in the a message queue 205. The message queue 205 orders the messages in an appropriate fashion, e.g., by their time of arrival.

A queue monitor 250 in communication with the queue handler 200 and the message queue 205 is responsible for removing a message from the message queue 205 and sending the same on to the SMSC 120 via an appropriate SMPP delivery application module 260.

If the SMSC 120 acknowledges receipt of the message, the message is then removed from the message cache directory 220 and marked as sent in the messages database 210. If, on the other hand, the SMSC 120 fails to acknowledge the message, the message is copied from the message cache directory 220 and placed back onto the message queue 205 for a subsequent retransmission at the appropriate time. In this fashion, messages are retransmitted until they are received.

A second exemplary provision of an API in a wireless Internet gateway 100 is the establishment and integration of a direct connection from a wireless Internet gateway to applications such as chat sessions. In particular, the wireless Internet gateway 100 may communicate directly with a chat server using, e.g., RMI techniques.

The wireless Internet gateway 100 is capable of supporting features to give messages certain characteristics and/or to include particular information with a message. For instance, message priority, callback numbers and/or validity times may be included with messages handled by the wireless Internet gateway 100.

In particular, messages can be given a priority. When a message has a particular priority, the priority is signaled to the SMSC 10, which in turn will expedite its delivery.

Callback numbers may be inserted with a message by the wireless Internet gateway 100. Callback numbers provide a service which generally makes it easier for a recipient to respond to a particular received message.

The wireless Internet gateway 100 may also mark messages with validity times. A validity time in a message allows a recipient to respond accordingly.

When a response is received from the wireless device, the wireless Internet gateway 100 passes the message directly to the application server 100. This session occurs through RMI to provide for the addition of new direct communication servers such as chat servers and web page interfaces.

When a short message of any type arrives at the wireless Internet gateway 100, the short message is examined for its type and destination. The type and destination of the short message dictate how it is handled.

For instance, if the received short message is an acknowledgement of a short message sent from the wireless Internet gateway 100, then a receipt acknowledgement of the short message is sent to the source of the short message. As another example, if the received short message is an E-mail destined for transmission over the Internet 190, then the E-mail message is passed to the relevant mobile E-mail application server (e.g., to the integrated SMPT mail server 300 or to an external SMTP application server 110*c*), which in turn sends the E-mail message to a mail relayer for ultimate transmission over the Internet 190.

In a like fashion, each short message received by the wireless Internet gateway 100 from a mobile device is sent to an appropriate (internally integrated or external) application server 110 for processing, e.g., to an HTTP server 110*a* for transmission over the Internet 190, to an SMTP E-mail server 300 for transmission over the Internet 190, etc.

The queue monitor 250 may communicate directly to the SMPP delivery module 260 utilizing appropriate SMPP protocol messages. However, to further abstract the particular protocol requirements away from the wireless Internet gateway 100, a generic destination interface 271 may be inserted between the queue monitor 250 (or other message source) and the destination handler.

The generic destination interface 271 provides an interface between the particular protocol on the destination side of the wireless Internet gateway 100 (e.g., SMPP as shown using the SMPP delivery module 260), and the messages in the message queue 205. In this way, adaptation to other protocols need change only the support of the generic destination interface 271 with respect to the destination handler (260-263).

For instance, the SMPP delivery module 260 may be replaced in the wireless Internet gateway 100 with, e.g., another wireless Internet gateway 261, an Internet gateway 262, or a paging terminal 263. While the SMPP delivery module 260, the wireless Internet gateway 261, the Internet gateway 262, and the paging terminal 263 are all shown together in FIG. 2, this is for convenience of explanation only. The disclosed embodiment relates to the implementation of only one of the destination handlers 260-263 in any one wireless Internet gateway 100.

Figure 3:
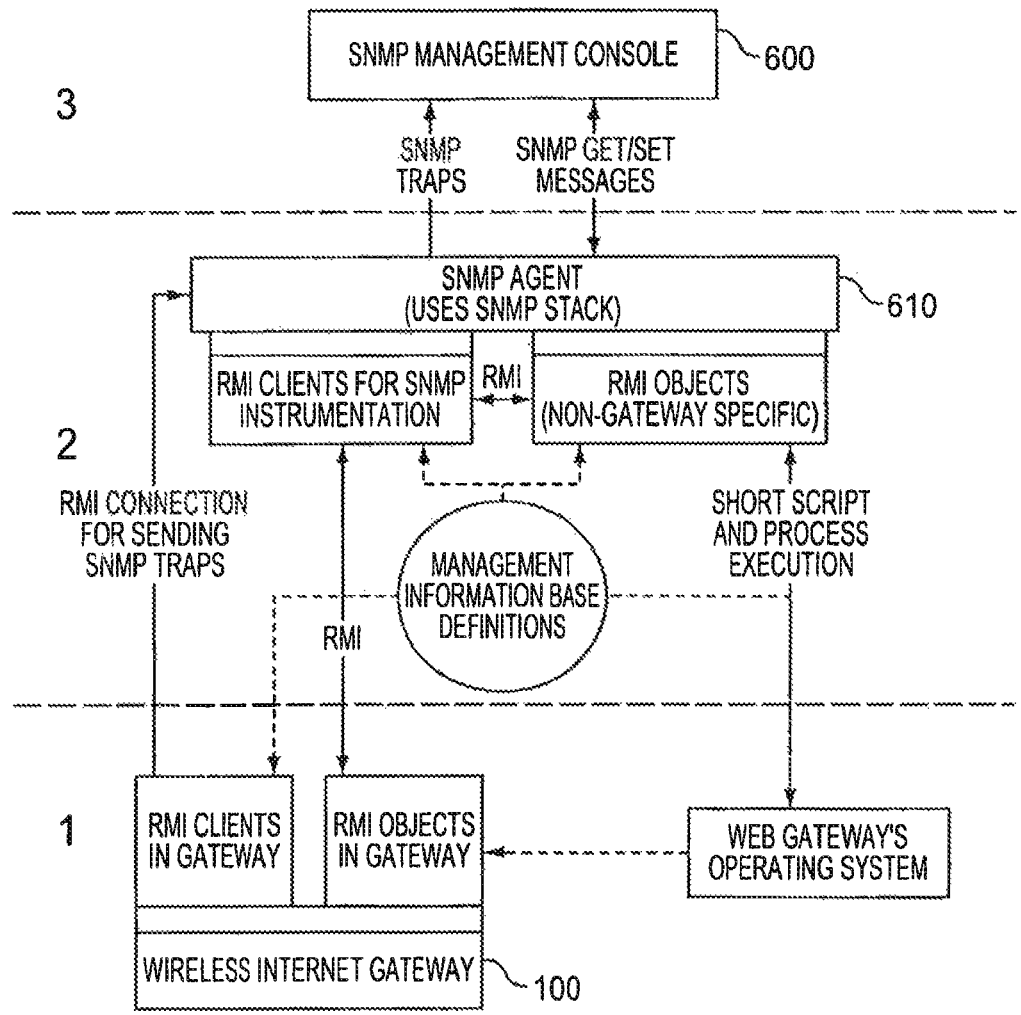
FIG. 3 shows the inclusion of an SNMP manager in a wireless Internet gateway and direct communication between wireless devices and application servers, in accordance with the principles of the present invention.

FIG. 3 shows the monitoring and control of the status of a wireless Internet gateway 100 in accordance with the principles of the present invention using a Simple Network Management Protocol (SNMP) manager 600.

In particular, as shown in FIG. 3, SNMP access to the wireless Internet gateway 100 may occur through Management Information Base (MIB) objects. The SNMP access can be considered to occur in three levels of abstraction: the top level 3 is the SNMP management console 600, the middle layer 2 of abstraction includes the SNMP agent 610, and the bottom layer 1 of abstraction includes the wireless Internet gateway 100 and inserted RMI objects.

When allowing direct communications between wireless devices and application servers, the relevant application server 110 binds to the wireless Internet gateway 100 and receives messages to and from the wireless device(s). These messages aren't queued but may be directly relayed from the wireless Internet gateway 100 to the SMSC 120 and the wireless device when they are received.

The status of the wireless Internet gateway 100 can be controlled and monitored by the Simple Network Management Protocol (SNMP) manager 600. For instance, the SNMP management console 600 may initiate a status inquiry. The SNMP agent 610 inserts a query status RMI object into the wireless Internet gateway 100, and the relevant status in the wireless Internet gateway 100 is obtained.

The wireless Internet gateway 100 may communicate with the SNMP agent 610 of an appropriate application server 110*b* via an RMI interface. The SNMP agent 610 of the application server 110*b* in turn communicates to the SNMP Management Console 600. Using this facility, the wireless Internet gateway 100 may essentially become an SNMP device, and thus can be remotely monitored and managed, e.g., from the SNMP management console 600 or remote scripts and programs.

Using SNMP management, the number of active SMPP links can be seen, the last error examined and other configuration changes made. In this way, the wireless Internet gateway 100 can be remotely reset if necessary or desired.

SNMP access to the wireless Internet gateway 100 may occur using Management Information Base (MIB) objects. Each MIB object defines an item to monitor or control. The MIB's may in turn be translated into Java code using a conventional SNMP development package. The generated Java code gathers an internal value of the wireless Internet gateway 100, and makes it visible to the SNMP agent 610. The code generated from an MIB object can also perform actions within the wireless Internet gateway 100 and in so doing, affect the state of the wireless Internet gateway 100 as desired.

The SNMP agent 610 communicates using RMI protocol. Services requiring SNMP access preferably use methods defined by the SNMP agent 610, which in turn communicates with the SNMP management console 600 using SNMP protocol.

SNMP traps, which reflect error or alert conditions in the wireless Internet gateway 100, go through the SNMP agent 610 for display on the SNMP management console 600. Remote processes and scripts may also monitor these traps.

Scripts and separate processes can talk SNMP remotely with the wireless Internet gateway 100. The code generated from the MIB's provides the interface to do this. This allows other monitoring processes to watch the wireless Internet gateway 100 and, for example, send notifications to an administrator if any problems occur. They send commands and configuration information as necessary also.

Figure 4:
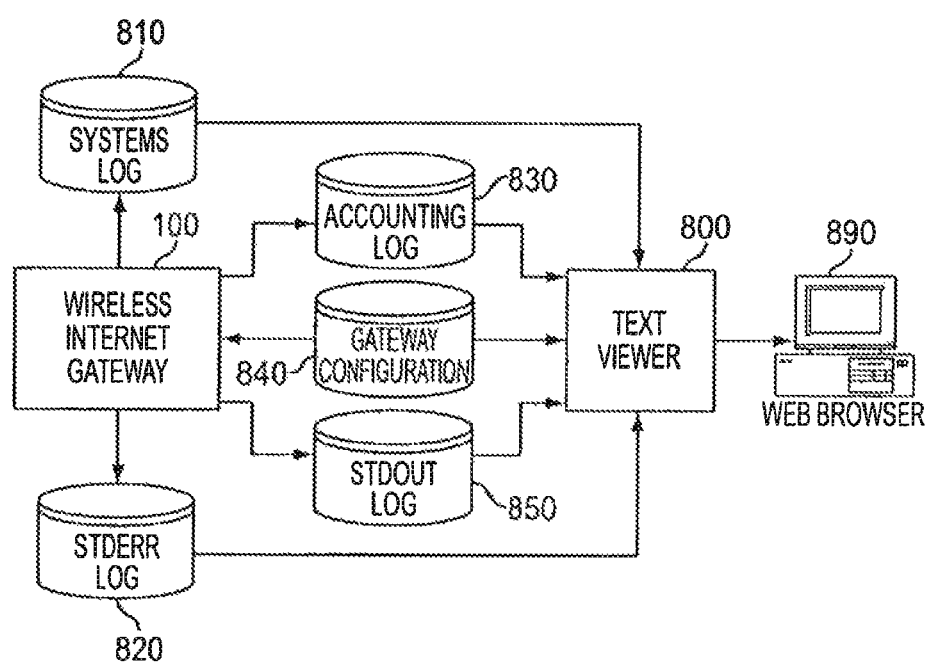
FIG. 4 shows exemplary log and configuration files utilized by a wireless Internet gateway, in accordance with the principles of the present invention.

FIG. 4 shows exemplary log and configuration files utilized by a wireless Internet gateway, in accordance with the principles of the present invention.

In particular, as shown in FIG. 4, the wireless Internet gateway 100 may maintain message logs of its activity for local or remote monitoring. For instance, plain-text files may be made available to be accessed and viewed. As an example of a plain-text file, a message log may be accessed with a text viewer 800, e.g., a web page server using a LogView Java servlet running on the host machine implementing the API of the wireless Internet gateway 100.

There are several files to which the text viewer 800 may provide access (e.g., read-only access). As shown in FIG. 4, they may comprise a systems log 810, an accounting log 830, a STDOUT log 850, and a STDERR log 820.

The text viewer 800 can also show a configuration file 840 for the wireless Internet gateway 100. The systems log file 810 may contain messages describing the operation of the wireless Internet gateway 100.

Messages typically have a severity level associated with them, e.g., a severity level 1 indicating a serious error and severity levels 2 through 9 being of decreasing severity. The text viewer 800 preferably filters and/or presents the messages based on their severity level.

The accounting log file 830 may contain a list of the messages sent through the wireless Internet gateway 100.

The STDERR log 820 and STDOUT log files 850 may contain messages from the API software of the wireless Internet gateway 100, and may be used by the administrator of the wireless Internet gateway 100 to determine if any program errors have occurred.

The wireless Internet gateway 100 can be statically configured at initialization time via the gateway configuration file 840.

Table 1 shows an exemplary sample gateway configuration file 840 for a wireless Internet gateway 100, in accordance with the principles of the present invention as follows:

TABLE 1

```
# ----------------------------------------------------------------------
#       smscgw.conf:          Configuration File for TCS SMS Web Gateway
#                             (c) 1998,1999, 2000 TCS, Inc.
# ----------------------------------------------------------------------
# --------------- Identification ---------------------------------------
GW_ID                    A                     # Msg Indentifier for GW
GWName                   admin@demosys.com     # Email address for gw msgs
Shutdown_MIN             0000000009            # MIN to shutdown gateway
# --------------- System Output ----------------------------------------
basedir ./                                     # base location of files
accountinglogfile        logs/acc.log          # account log file name
systemlogfile            logs/system.log       # system log file name
accountingloglevel       9                     # Level of accounting log detail
systemloglevel           9                     # Level of system log detail
debugmode                yes                   # Send SMPP info to StdOut
do_email_debug           yes                   # Show SMTP Interactions
smtpSocketTimeout        10                    # Time socket waits for input
                                               # before it times out
smtpSocketLinger         10                    # Time OS keeps socket alive
                                               # after application closes socket
smtpListenerSleepInterval 50                   # Time (milliseconds) to pause
                                               # between successive SMTP connections
                                               # between successive implies 200
                                               # connections per second
# --------------- Database References ----------------------------------
MessageStoreType         D3                    # File System (FS) or Database
                                               # (DB) storage or None or DB Cache (DBC)
#Connection information for accessing the Message Store
MessageStoreDbClass      oracle.jbdc.driver.OracleDriver
Message StoreDbUrl       jdbc:oracle:thin:@dbhost.demosys.com:1251:ORCL
MessageStoreDbAccount    webdb
MessageStoreDbPw         private
msgLifespanHours         8                     # How long to retain message data
reqeueIntervalSecs       60                    #How often to reqeue unpack'd msgs
q_cachepath              ./cache/              # directory for unpack'd msg indicators
q_msgpath                ./messages/           # directory for FS database files
PendingCacheThreshold    5C
PollPendingCache 10
# --------------- Features ---------------------------------------------
enable_smtp              yes                   # Enable Email Support
smtp_port                25                    # Port for receiving email
enable_web               yes                   # Enable RMI for Web (and other RMI clients)
enable_smpp              yes                   # Enable SMPP output to SMSCs (reqd)
enable_calendar          no                    # Enable Web Calendar support
enable_monitor           yes                   # Enable free memory monitor
memoryCheckRestTime      180000                # ms time for checking avbl memory
memoryThreshold          256                   # xb threshold for generating alert
msg_maxlen               90                    # Max length in a single message
msg_link_maxlen          150                   # Max total length of msg through linking
enable_antispam          yes                   # Enable msg qty limitations
SpamMaxSendQty           100                   # Max no. msgs that can be sent per period
SpamMaxRecvQty           100                   # Max no. msgs that can be recvd per period
```

TABLE 1-continued

| | | |
|---|---|---|
| SpamTimePeriod | 1 | # Time period, in hours |
| SpamInValidSenders | 987.654.321.000 | # Senders that are always refused |
| SpamValidSenders | admin@demosys.com | # Sender exempt from anti-spam checks |
| SpamValidReceivers | 98766543210,1234567890 | #Receivers exempt from anti-spam checks |
| forceSNReturnReceipt | no | # Always request return receipt from SMSC |
| AlwaysDoEmailReceipt | no | # Always send a receipt to E-mail senders |
| AlwaysDoEmailReceipt_Exclude | demosys.com | # Senders to exclude if above is enabled |
| validateScheme | 0 | # 0+RANGE, 1+LOOSE, 2+Explicit |
| supportAltAddressing | yes | # PIN/Alias lookups allowed |
| minLength | 10 | # Length of a valid MIN |
| PinLength | 6 | # Length of valid PIN |
| PinPrefix | P | # Prefix to identify PINs |
| supportSubmitTranslate | no | # Do User vs Submit Address (DN/MIN) xlation |
| heartbeatsecs | 180 | # seconds between heartbeats; 0 = no |
| # ---------------- Message Destinations ------------------------------------------------- | | |
| Sn_count | 1 | # number of SMSCs attached |
| Sn_type0 | tcs.ain:smsgw.SmsGwSNSMPPLink | |
| serializeSmppTraffic yes | | |
| smpp_host0 | localhost | # Host name of first SMSC |
| smpp?TXport0 | 7001 | # SMPP Tx port for first SMSC |
| smpp_RXport0 | 7002 | # SMPP Rx port for first SMSC |
| smpp_bind_password0 | secret | # SMSC/SMPP Password |
| smpp_bind_sysID0 | EE | # SMSC/SMPP System ID |
| smpp_bind_sysType0 | INET_GW | # SMPP Client identifier |
| smpp_valid_min_range0 | 3102800000  5102802000  0000000009 0000000009 | |
| smpp_template0 | 1 | # SMSC Template for sending messages |
| smpp_callback_trigger0 | SA | # Trigger for embedding callback number |
| smpp_message_trigger0 | SM | # Trigger for identifying message text |
| smpp_service_type0 | PAGE | # Service Type; Comment out for Aldiscon |
| smpp_src_addr_ton0 | 0 | # Type of Number; TCS=0 |
| smpp_src_addr_npi0 | 0 | # Numbering Plan Identity; TCS=0 |
| smpp_dst_addr_ton0 | 1 | |
| smpp_dst-addr_npi0 | 1 | |

The gateway configuration file 840 may set such parameters as, e.g., the maximum message length, message transmission timeout, host names, and/or wireless device access number ranges. The gateway configuration file 840 may be a plain-text file which is created/modified with a standard text editor. The gateway configuration file 840 may contain configuration parameters in a tagged data format. Tagged data format is a descriptive term describing the configuration item and the item's value.

One parameter that may be configured in the gateway configuration file 840 is a spam filter. Spam is unsolicited and unwelcome E-mail. By reading the spam configuration values as defined by appropriate spam parameters, the wireless Internet gateway 100 can prevent too many messages from the same sender going to a particular recipient. Also, the wireless Internet gateway 100 can prevent one sender from sending an excessive number of messages via the wireless Internet gateway 100.

The wireless Internet gateway 100 may keep track of the number of messages a sender has sent and/or how many messages a particular recipient has received.

If the configuration values are exceeded, a message may be sent to the systems log 810. This provides, among other things, the ability for a wireless carrier to base a subscriber rate based on their own specifically monitored use of the Internet (e.g., on a number of messages sent and/or received via a wireless Internet gateway 100).

Support for internationalization may be included in the wireless Internet gateway 100. For instance, responses to users can be configured to reflect the language in the local region where the wireless Internet gateway 100 has been deployed. Internationalization may be implemented using Java property files and its internationalization APIs.

As an example, to provide internationalization, the gateway configuration file 840 might contain the following two lines:

| | | |
|---|---|---|
| LocaleLanguage | es | # ISO 639 language code |
| LocaleCountry | AR | # ISO 3177 country code |

This demonstrates how an administrator may specify which language and/or in which country the wireless Internet gateway 100 will operate. If the locale parameters are not present in the gateway configuration file 840, the language and country may default, e.g., to English (en) and the United States (US), respectively.

The property files may include a corresponding es_AR string in the file name. For example, the SMPP.properties file (which implies en_US) may contain a number of possible error messages, e.g.:

| # ERROR/STATUS CODE DESCRIPTIONS |
| --- |
| ErrorCode0=Message accepted |
| ErrorCode1=Message too long |
| ErrorCode2=Internal Error: SMPP Command too long |
| ErrorCode3=Internal Error: Invalid SMPP Command ID |

The SMPP_es_AR.properties file may include the following corresponding lines:

| # ERROR/STATUS CODE DESCRIPTIONS |
| --- |
| ErrorCode0=Mensaje aceptado |
| ErrorCode1=Su mensaje es demasiado largo |
| ErrorCode2=Longitud de comando no válida |
| ErrorCode3=Identificación de comando no válida |

User parameters may be restricted. For instance, to control which parameters a customer can configure, the wireless Internet gateway 100 may work with an encrypted license. The license may encapsulate a variety of parameters associated with a customer's license agreement.

In particular, a third-party license generator may create a customer license in the form of an encrypted file containing all pertinent license information. This may be accomplished by running the license generator and providing it with the allowed configuration. An encrypted license file, e.g., smscgw.lic, may be deployed with the wireless Internet gateway 100. Thus, when the wireless Internet gateway 100 is started, it reads the license file and as it performs its functions, it may query the license properties and behave accordingly.

Figure 5:
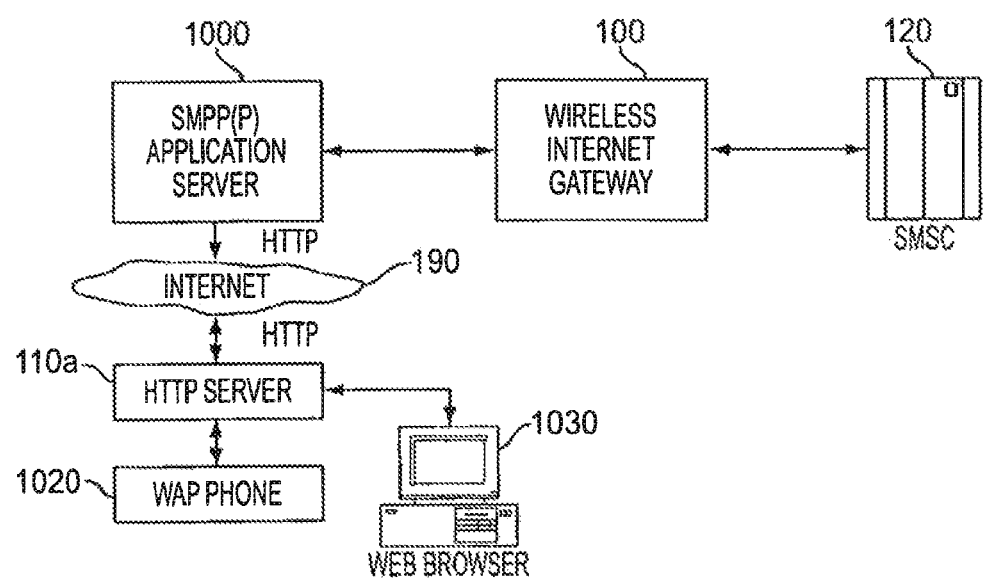
FIG. 5 shows the provisioning capabilities of a wireless Internet gateway via a web page or from a remote wireless device, in accordance with the principles of the present invention.

FIG. 5 shows the provisioning capabilities of a wireless Internet gateway 100 via a web page or from a remote wireless device using an external SMPP(P) application server 1000, in accordance with the principles of the present invention.

In particular, as shown in FIG. 5, SMPP Provisioning Protocol, also known as the SMPP(P) protocol, allows for the creation, modification and deletion of subscribers, paging subscribers and distribution lists within the SMSC 120. The wireless Internet gateway 100 may have provisioning capabilities provided via a web page on an appropriate PC or other computer device operating a web browser 1030. The web browser 1030 utilizes HTTP protocol messages to an appropriate HTTP server 110a, which in turn communicates with the SMPP(P) application server 1000, e.g., via the Internet 190 or an Intranet.

Alternatively, provisioning for the wireless Internet gateway 100 may be provided from a remote wireless device such as a Wireless Access Protocol (WAP) phone 1020.

SMPP may be implemented as another application server 110 using the RMI protocol as shown in FIG. 5 (or internally as shown in FIG. 2). In any case, the wireless Internet gateway 100 handles transmission and receipt of SMPP(P) messages with the SMSC 120.

The wireless Internet gateway 100 may include one or more integrated communication interfaces, e.g., simple mail transfer protocol (SMTP).

Figure 6:
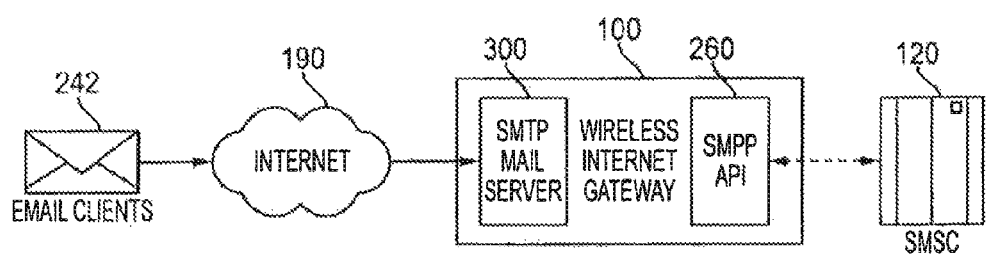
FIG. 6 shows exemplary wireless Internet gateway support of a simple mail transfer protocol (SMTP) mail server, in accordance with the principles of the present invention.

FIG. 6 shows exemplary wireless Internet gateway support of a simple mail transfer protocol (SMTP) mail server, in accordance with the principles of the present invention.

In particular, as shown in FIG. 6, a wireless Internet gateway 100 including SMTP support includes an integrated SMTP mail server 300 connected to the Internet 190. E-mail is passed between the integrated SMTP mail server 300 and the SMPP application programming interface 260 of the wireless Internet gateway 100.

The SMTP mail server 300 shown in FIG. 7 may insert messages into the message queue 205 shown in FIG. 2 directly, without the need to utilize RMI techniques. However, the wireless Internet gateway 100 may alternatively or additionally communicate using RMI techniques with a particular application server 100c which provides e-mail services.

The integration of the SMTP mail server 300 into a wireless Internet gateway 100 allows mail from standard E-mail clients 242 to be sent to the wireless Internet gateway 100 and ultimately on to wireless devices serviced by the SMSC 120 in communication with the wireless Internet gateway 100. The SMTP mail server 300 translates messages between SMTP protocol messages between the wireless Internet gateway 100 and the Internet 190, and SMPP protocol messages between the wireless Internet gateway 100 and the SMSC 120.

The SMTP mail server 300 may be part of the software constituting the application programming interface (API) of the wireless Internet gateway 100, and preferably otherwise operates as a standard mail server.

In operation, the disclosed SMTP mail server 300 of the wireless Internet gateway 100 monitors a mail port defined by a configuration file for the wireless Internet gateway 100, and answers mail requests sent from E-mail clients 242. When an E-mail client 242 sends an E-mail message to a wireless device serviced by the SMSC 120, the wireless Internet gateway 100 receives and queues the E-mail messagefl. Then, the wireless Internet gateway 100 sends the E-mail message to the relevant SMSC 120 using SMPP protocol for transmission to the relevant wireless handset in the wireless network 130.

The API of the wireless Internet gateway 100 may also ensure that an E-mail message is truncated if necessary, e.g., if the E-mail message is longer than the currently configured maximum message length. In addition, or alternatively, the API of the wireless Internet gateway 100 may be configured to break long E-mail messages up into several separate transmissions for transmission to the SMSC 120 and on to the relevant wireless handset in the wireless network 130.

A user of a mobile device in a wireless network 130 including a wireless Internet gateway 100 in accordance with the principles of the present invention may initiate an E-mail message from their mobile device, and may receive a receipt therefore indicating that the destination has received and/or reviewed the E-mail message. In such a case, the wireless Internet gateway 100 will send the mobile originated E-mail message to an appropriate E-mail server 110c using RMI (if external to the wireless Internet gateway 100), and that E-mail server 110c will accomplish delivery of the E-mail message.

In the disclosed embodiment, communications between wireless devices and the SMSC 120 of a wireless network 130 and the wireless Internet gateway 100 utilize messages conforming to standard SMPP v3.3 protocols for mobile terminated (MT) communications, with the following exceptions in the case of mobile originated (MO) communications:

1. The registered_delivery flag is utilized.
2. A "$R" trigger exists in every message body indicating a source-unique tracking number.
3. User responses are contained within the stat component of the standard delivery receipt.
4. Message types are identified by the esm_class field.

Alpha-numeric E-mail may be embedded in the source_addr field for a short message. In particular, E-mail addresses can be embedded in source_addr field for submit_sm messages, and in the destination_addr for deliver_sm messages. Such embedding provides an indication as to where the particular E-mail comes from, and where it should go. The conventional 20 character (or other length) limitation may be extended as necessary or desired for these particular fields.

FIGS. 8A and 8B show exemplary scenarios describing interaction between a mobile device, its SMSC 120, and a wireless Internet gateway 100 as an SMPP client, in accordance with the principles of the present invention. In these exemplary scenarios, an E-mail message is communicated.

Figure 7A:
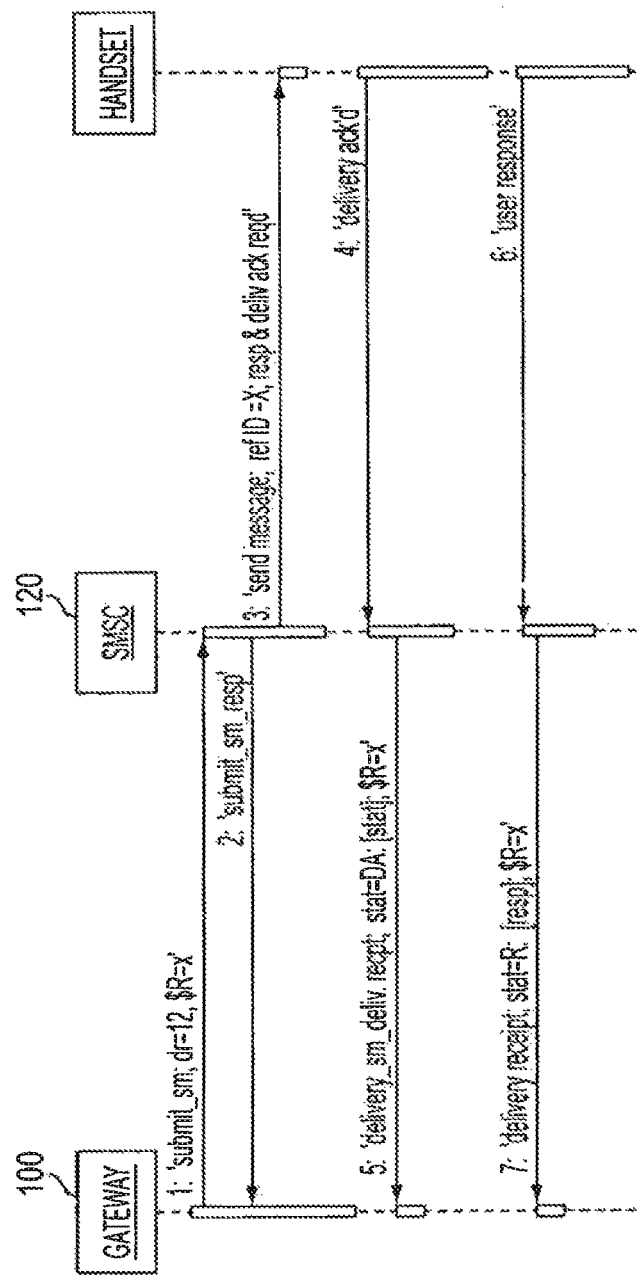
FIG. 7A shows an exemplary mail send/receipt process flow in the direction from a wireless Internet gateway towards a wireless handset, in accordance with the principles of the present invention.

FIG. 7A shows an exemplary message flow when a wireless Internet gateway 100 originates a short message requiring SME delivery acknowledgement and a response from the recipient, in accordance with the principles of the present invention.

In particular, as shown in FIG. 7A, a wireless Internet gateway 100 sends a message to a mobile wireless handset device, and requests two types of delivery feedback: (1) acknowledgement of when the user reads the message; and (2) a response code from the user.

The message is derived from an E-mail message received from the Internet to an address, e.g., "MIN@[gateway]". The wireless Internet gateway 100 supplies the sender's E-mail address so that it may be processed by the mobile wireless handset device.

Note that in the preferred embodiment, the wireless Internet gateway 100 will not request delivery feedback of any kind when submitting short messages for incoming E-mail.

In step 1 of FIG. 7A, the wireless Internet gateway generates a SUBMIT_SM message with key elements populated in the following way:

| | |
|---|---|
| service_type: | page |
| source_addr: | [sender's E-mail address] |
| destination_addr: | handset's MIN |
| registered_delivery_flag: | 12 (bits 2&3 enabled) |
| short_message: | $R[13-bit gateway id]$M[E-mail body] |

If the registered_delivery_flag is 0 or 1, then the $R value is not required.

In step 2 of FIG. 7A, the SMSC sends a standard submit_sm_response message. The response is matched to the submit_sm by sequence number. The body contains the SMSC-generated tracking number.

In step 3 of FIG. 7A, the SMSC delivers the message to the mobile device in compliance with 637A.

In step 4 of FIG. 7A, the user of the mobile device reads the message. A Delivery Ack is sent by the mobile device through the network to the SMSC.

In step 5 of FIG. 7A, the SMSC generates a Deliver_SM message to the wireless Internet gateway using a Delivery Receipt template. The "stat" portion of the delivery receipt may use identical values as the normal SMSC Delivery Receipt. In the given example, the value for the esm_class is 8 (bit 3 enabled).

The "text" portion of the delivery receipt will also include the $R trigger prior to any text, thus indicating the MO tracking number. This tracking number will be the same that was assigned by the original submit_sm in step 1. A $M trigger following the $R value contains the first 20 characters of the original short message.

As an example, the "text" portion may contain "$R9998$MThis was a MO test".

In step 6 of FIG. 7A, the user of the mobile device responds to the received short message with a keypress or other action which results in the generation of, e.g., a value of "3".

In step 7 of FIG. 7A, the SMSC generates a Deliver_SM message to the wireless Internet gateway again using the Delivery Receipt template. In the given example, the "stat" portion of the message contains the response code. e.g., "3". The esm_class value is "16" (bit 4 enabled).

As with step 5, the "text" portion of the delivery receipt is in the format $R[ref #]$M[message text]

The delivery feedback may be dependent on the registered_delivery_flag value. For example, a value of 8 (bit 3 enabled) may cause only the User Response code to have been returned.

Figure 7B:
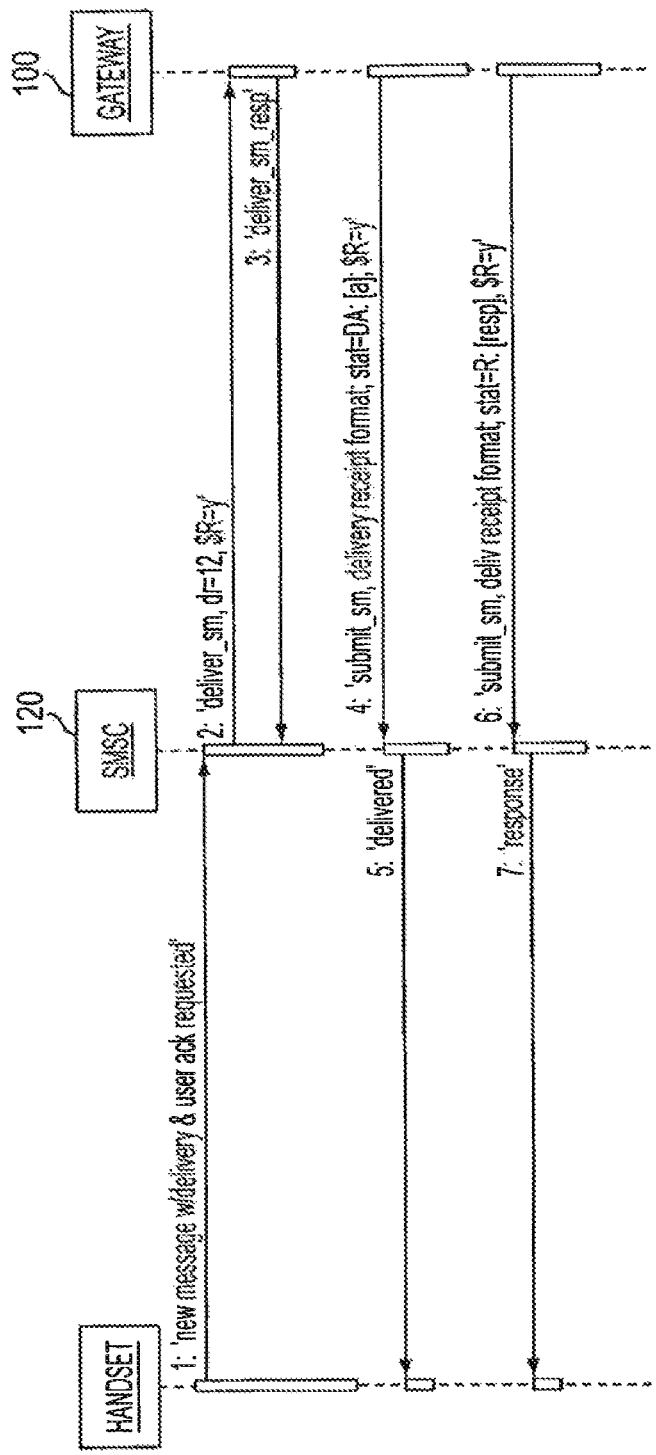
FIG. 7B shows an exemplary mail send/receipt process flow in the direction from a wireless handset towards a wireless Internet gateway, in accordance with the principles of the present invention.

FIG. 7B shows a mobile device originating a message requiring SME delivery acknowledgement and a user response as it interacts with a wireless Internet gateway, in accordance with the principles of the present invention.

In particular, as shown in FIG. 7B, a mobile device originates a message to the wireless Internet gateway, requesting both delivery receipt and a response code from the recipient. The short message could be submitted to an E-mail address and the mobile device can request a delivery receipt to ensure that the short message was delivered successfully.

If desired, User Response codes need not be supported for mobile originated E-mails.

In step 1 of FIG. 7B, the mobile device generates a mobile originated short message addressed to a particular E-mail address.

In step 2 of FIG. 7B, the SMSC parses the destination address, determines that it is formatted like an E-mail address, and forwards it to the wireless Internet gateway over the SMPP (rx) connection.

A Deliver_SM message is generated with the following key field values:

| | |
|---|---|
| service_type: | page |
| source_addr: | [handset's MIN] |
| destination_addr: | [destination E-mail address] |
| registered_delivery_flag: | 12 (bits 2&3 enabled) |
| short_message: | $R[new ref id]$M[message] |

The [new ref id] may be generated by the mobile device and forwarded by the SMSC through the $R trigger.

In step 3 of FIG. 7B the wireless Internet gateway generates a deliver_sm_resp code. This contains the internal tracking number of the wireless Internet gateway within the message body. The sequence number matches that of the Deliver_SM.

In step 4 of FIG. 7B, the wireless Internet gateway has 'read' the short message, and generates a delivery receipt to the SMSC. For example, it would generate a delivery receipt showing the result of an attempt to forward the E-mail message.

The delivery receipt may be formatted as shown and described with respect to step 5 in FIG. 7A. In particular, the "stat" field contains the status code and the "text" field contains the $R[ref id]$M[message] content. The Reference ID value is the same as received from the deliver_sm in step 2 of FIG. 7B. The esm_class is 8.

In step 5 of FIG. 7B, the delivery message is forwarded to the mobile device.

In step 6 of FIG. 7B, if the wireless Internet gateway were to provide a response code, it would generate a delivery receipt with the response code within the "stat" element and the esm_class=16. This would be passed through a submit_sm message to the SMSC. Of course, delivery receipt need not be implemented in any particular application.

In step 7 of FIG. 7B, the SMSC will forward the response code to the mobile device.

Figure 8:
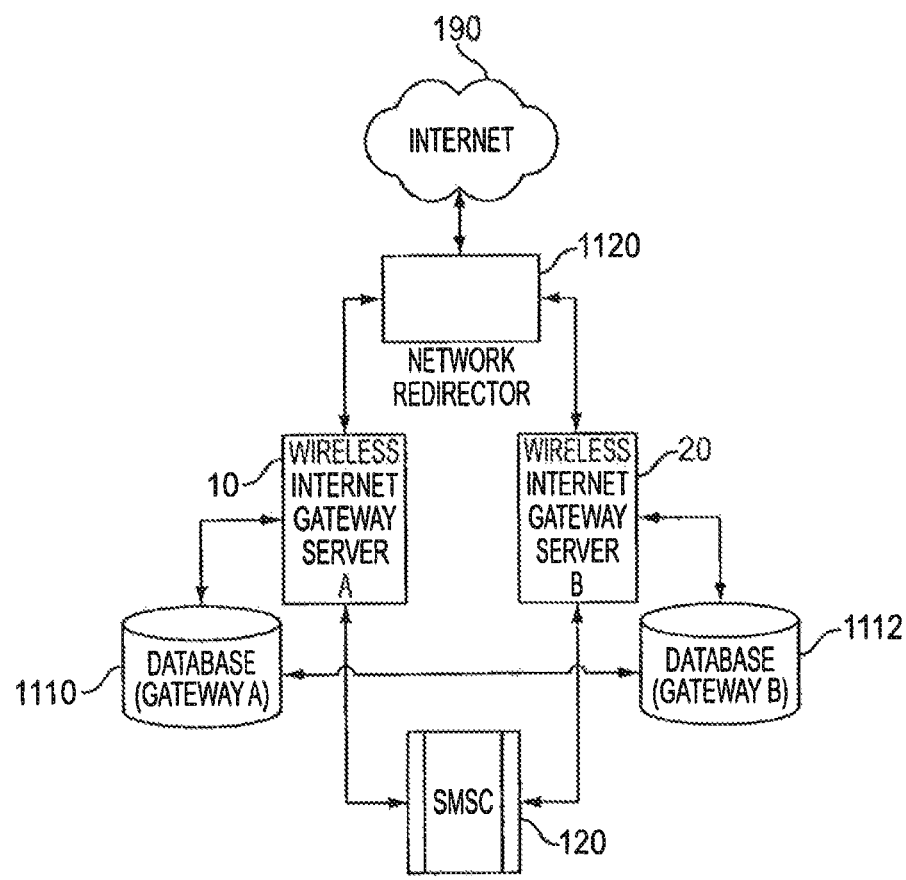
FIG. 8 shows a redundant configuration for wireless Internet gateways, in accordance with the principles of the present invention.

FIG. 8 shows a redundant configuration for wireless Internet gateways 100, in accordance with the principles of the present invention.

In particular, as shown in FIG. 8, a wireless Internet gateway 100 in accordance with the principles of the present invention can be configured to run redundantly on separate hardware platforms. In this environment, separate wireless Internet gateway servers 10, 20 can be configured to share the workload of client processing and/or serve as hot-standby servers.

A first wireless Internet gateway 10 provides communication between an SMSC 120 and the Internet 190. Similarly, a second wireless Internet gateway 20 provides communication between the SMSC 120 and the Internet 190. A network redirector device 1120 evenly distributes incoming traffic between the first wireless Internet gateway 10 and the second wireless Internet gateway 20.

Each of the first and second wireless Internet gateways 10, 20 are given access to separate databases 1110, 1112 in which they each maintain information about their respective messages. The first wireless Internet gateway 10 can be designated as the primary device, with the corresponding database 1110 designated as the primary database. The second wireless Internet gateway 20 and corresponding database 1112 can be designated as secondary devices.

As messages are processed on one wireless Internet gateway 10, 20, appropriate database software may synchronize information with the other database(s).

Upon failure of a primary wireless Internet gateway 10, the network redirector 1120 transparently routes the failed wireless Internet gateway's traffic to the remaining wireless Internet gateway(s) 20. In this way, any pending messages from the failed wireless Internet gateway 10 will not be lost because they will have been sent not only to the database 1110 corresponding to the failed wireless Internet gateway 10, but also to the other database(s) 1112 corresponding to the secondary, backup wireless Internet gateway(s) 20.

Redundant architecture such as that shown in FIG. 8 includes primary wireless Internet gateway databases 1110, and secondary wireless Internet gateway databases 1112 maintaining information about short messages.

The first and second wireless Internet gateways 10, 20 may ordinarily share the load imposed upon them. However, if one wireless Internet gateway 10, 20 should fail, its messages may be automatically redirected by the network redirector 1120 and then handled by one of the redundant wireless Internet gateways 20.

The wireless Internet gateway 100 provides an abstracted mechanism for sending mobile terminated (MT) messages, where the MT delivery protocol is encapsulated from other GW software components. Using the generic destination interface 271, two-way messaging may be implemented to support any relevant protocol, e.g., SMPP, Reflex, SNPP, SMTP, and other protocols.

Two-way messaging may be enabled and disabled in the same way that the RemoteSMPP and other pieces are controlled. The configuration file 840 may define whether or not two-way messaging is enabled, and/or an encrypted license file may also include permission to enable two-way messaging.

FIGS. 9A to 9C and 10A to 10C show an exemplary software module hierarchy and relationships for a wireless Internet gateway 100 implementing two-way messaging, in accordance with the principles of the present invention.

In particular, the exemplary two-way messaging software package hierarchy may be implemented, e.g., with a number of key components:

TwoWayMessage 708, which is an independent Message class for 2-way communication.

ImessageReceiver 706, which classifies objects able to receive TwoWayMessages.

ImessageSender 704, which classifies objects able to send TwoWayMessages.

Registrar 702, which facilitates connecting receivers and senders.

A Config class 712 may be configured to interact with the Registrar 702 at runtime in order to dynamically assign sender/receiver relationships. A sender can have any number of receivers.

Sub-packages define particular aspects of the 2-way capabilities. For example, an 'smtp' sub-package 720 defines a Sender and Receiver that know how to send and receive SMTP 2Way Messages. The TwoWayMessage class 708 is abstract; subclasses provide details specific to particular protocols being used. This allows the handlers to set and retrieve protocol-specific parameters, while still allowing the messages to be treated in a generic manner.

A 'remote' package 722 provides a mechanism for remote RMI objects to register as 2-way message receivers and senders. This approach is akin to the RemoteSMPP module, where external apps can register as SMPP listeners as well as originate SMPP messages into the wireless Internet gateway. However, this approach is preferable because it is not tied to a particular protocol.

Protocol handlers within the wireless Internet gateway 100, such as the SMTP handler 240 (FIG. 2) and the SMPP Delivery module 260 will interact with the two-way software modules. Thus, if a generic two-way feature is enabled in the config file 840, then the SMTP and SMPP listeners will also forward (select) traffic through the two-way module to be delivered to potential listeners.

The API software of the wireless Internet gateway 100 preferably allows objects both within and external to the wireless Internet gateway 100 to receive and send messages in a protocol independent manner.

Integrating listeners and senders can be simplified and configurable at runtime through the use of the configuration file 840. This is especially true of external applications that wish to register a listeners for particular message senders.

The wireless Internet gateway 100 preferably gracefully handles 'disconnected' Remote applications. If an external application is stopped or re-started, the wireless Internet gateway 100 preferably logs an error and cleans up all internal references occupied by the remote application.

Using two-way messaging, a Mobile Terminated Receiver object may be made available in the wireless Internet gateway 100 by which messages can be delivered into the message queue 205.

Figure 9A:
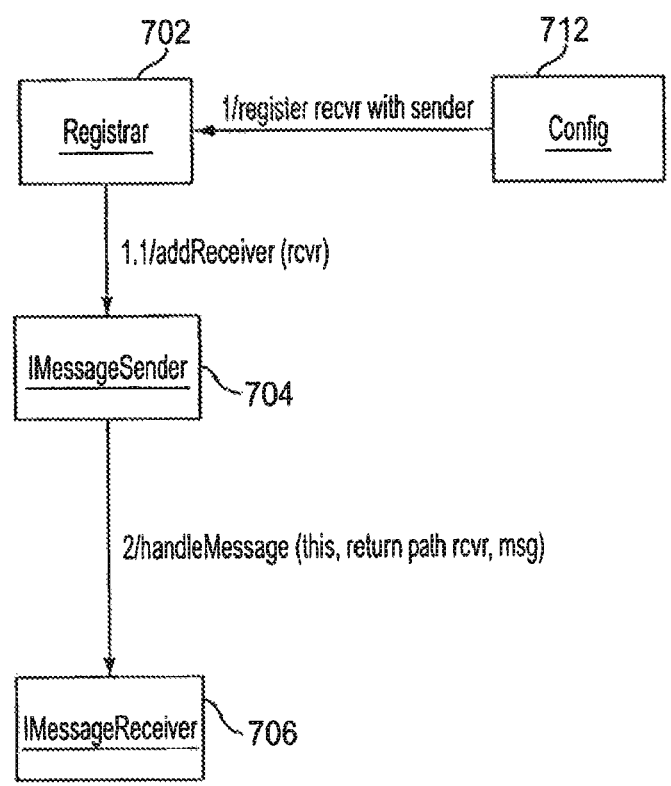
FIGS. 9A to 9C and 10A to 10C show an exemplary software module hierarchy and relationships for a wireless Internet gateway 100 implementing two-way messaging, in accordance with the principles of the present invention.
Figure 9B:
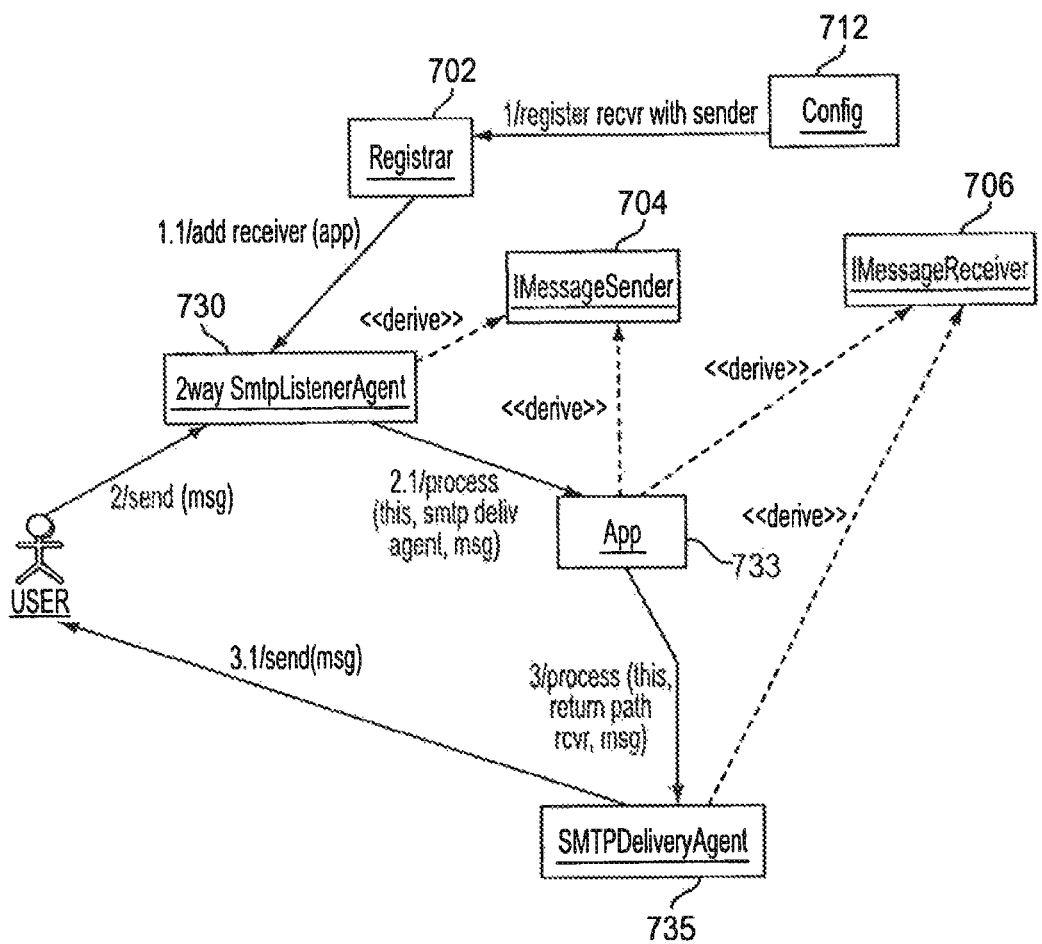

FIG. 9B illustrates how messages would flow in an SMTP environment.

In particular, as shown in FIG. 9B, a 2WaySMTPListenerAgent 730 implements an IMessageSender interface 704. It is therefore able to send messages to whatever ImessageReceivers 706 might want to register with it. The 2WaySMTPListenerAgent 730 would be optionally created by a tcs.ain.smsgw.SMTPSession class. Whenever SMTP messages are sent to a particular address, they are sent to the 2WaySMTPListenerAgent 730 rather than delivered into the message queue 205.

The 2WaySMTPListenerAgent 730 then forwards the message (step 2.1) to each IMessageReceiver object 706 that had registered with it through the addReceiver( ) function in step 1.1. When the 2WaySMTPListenerAgent 730 tells the receiver to process the message, it includes three parameters: itself (the Sender), a "Return Path" IMessageReceiver object 706 through which responses can be made, and finally the message itself.

In this example, the message is sent to 'App' 733, which implements both the sender and receiver interfaces. After App 733 receives and processes the message, it will want to send a response back. Reponses must be returned to the 'return path' IMessageReceiver object 706 that was provided when the message was received. Since App 733 is also a sender, it can directly send the response message to the return path receiver.

In this case, the SMTPDeliveryAgent 735 is the receiver that had been specified. The message is received by the SMTPDeliverAgent 735 (step 3), and then forwarded back to the user.

Figure 9C:
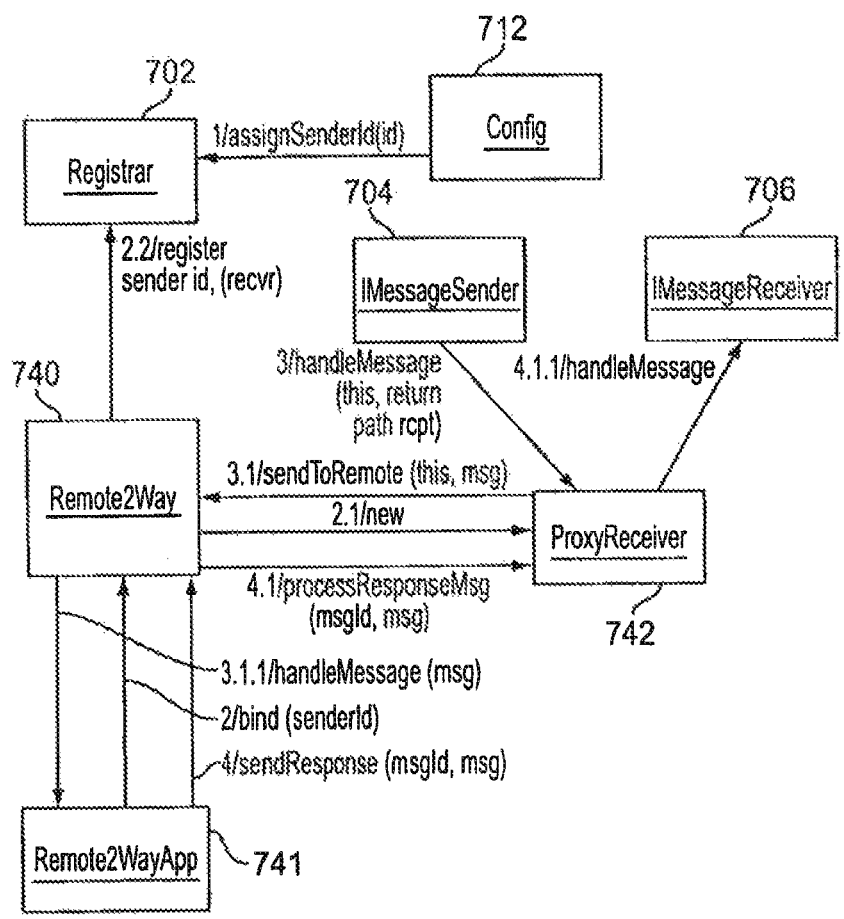
Figure 10A:
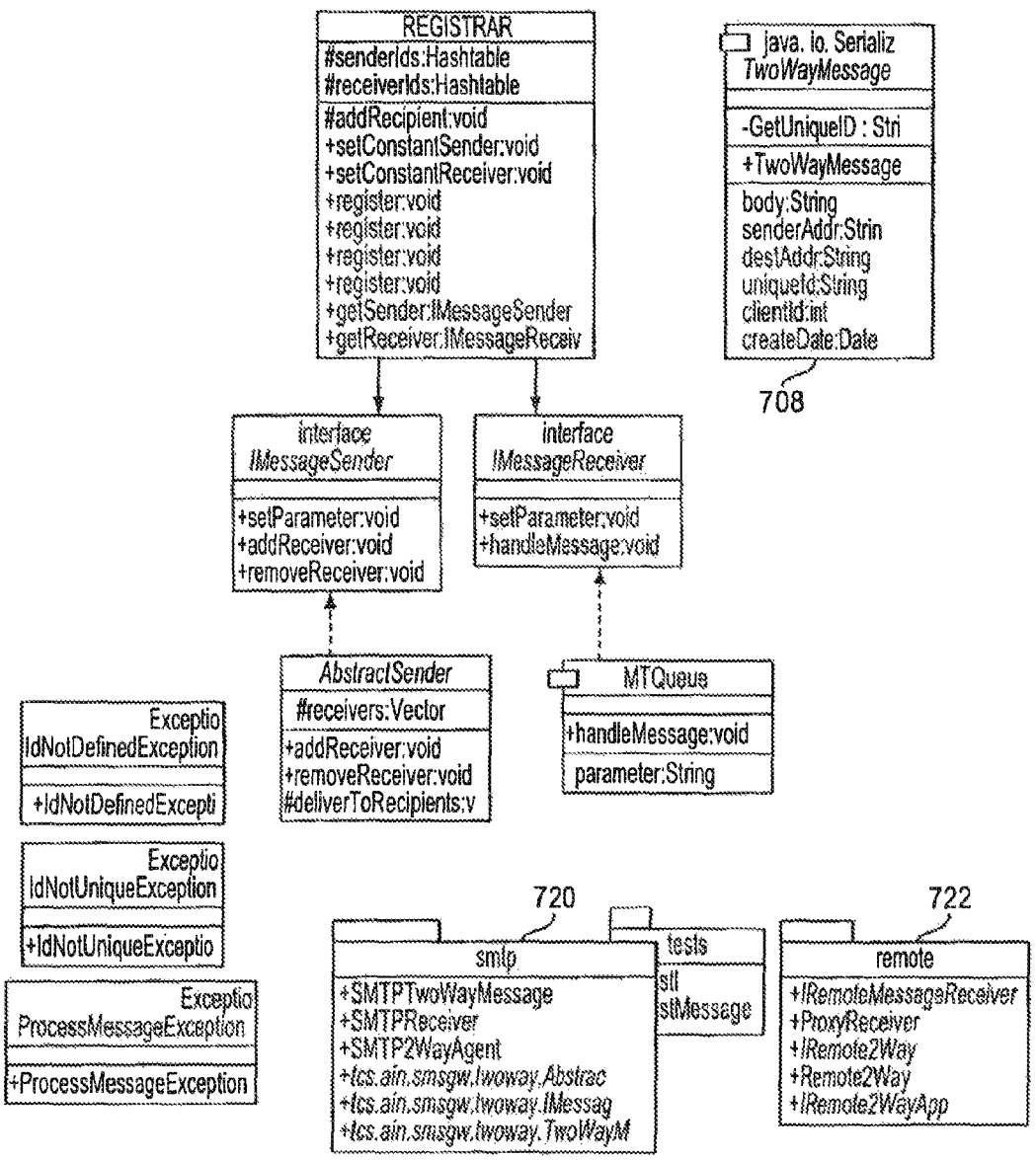
Figure 10B:
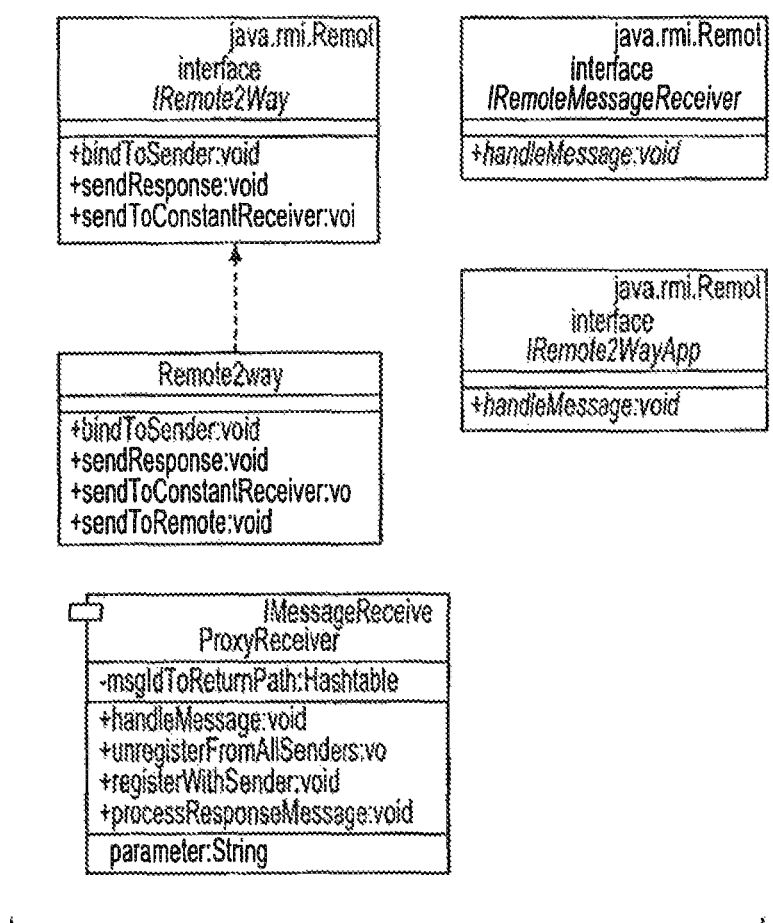
Figure 10C:
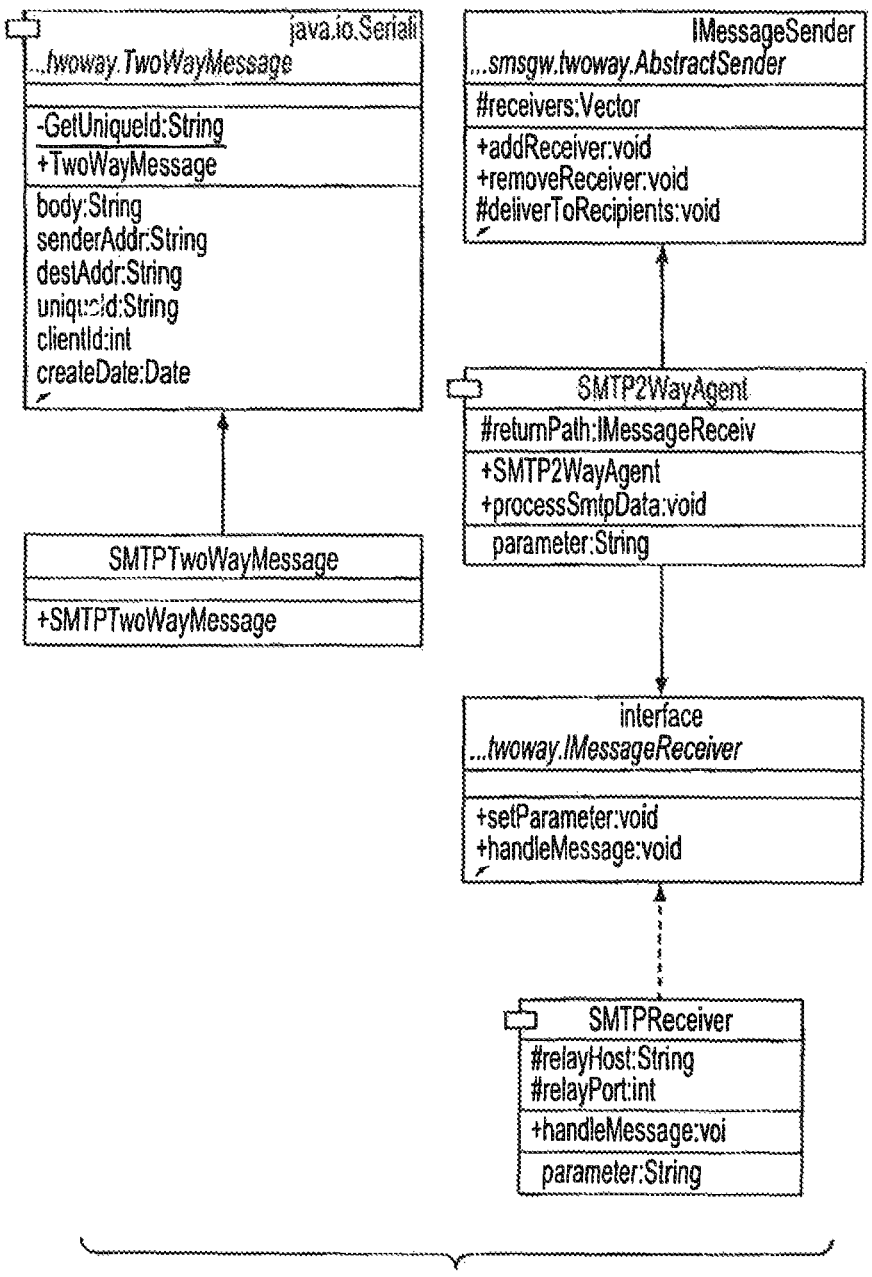
Figure 11:
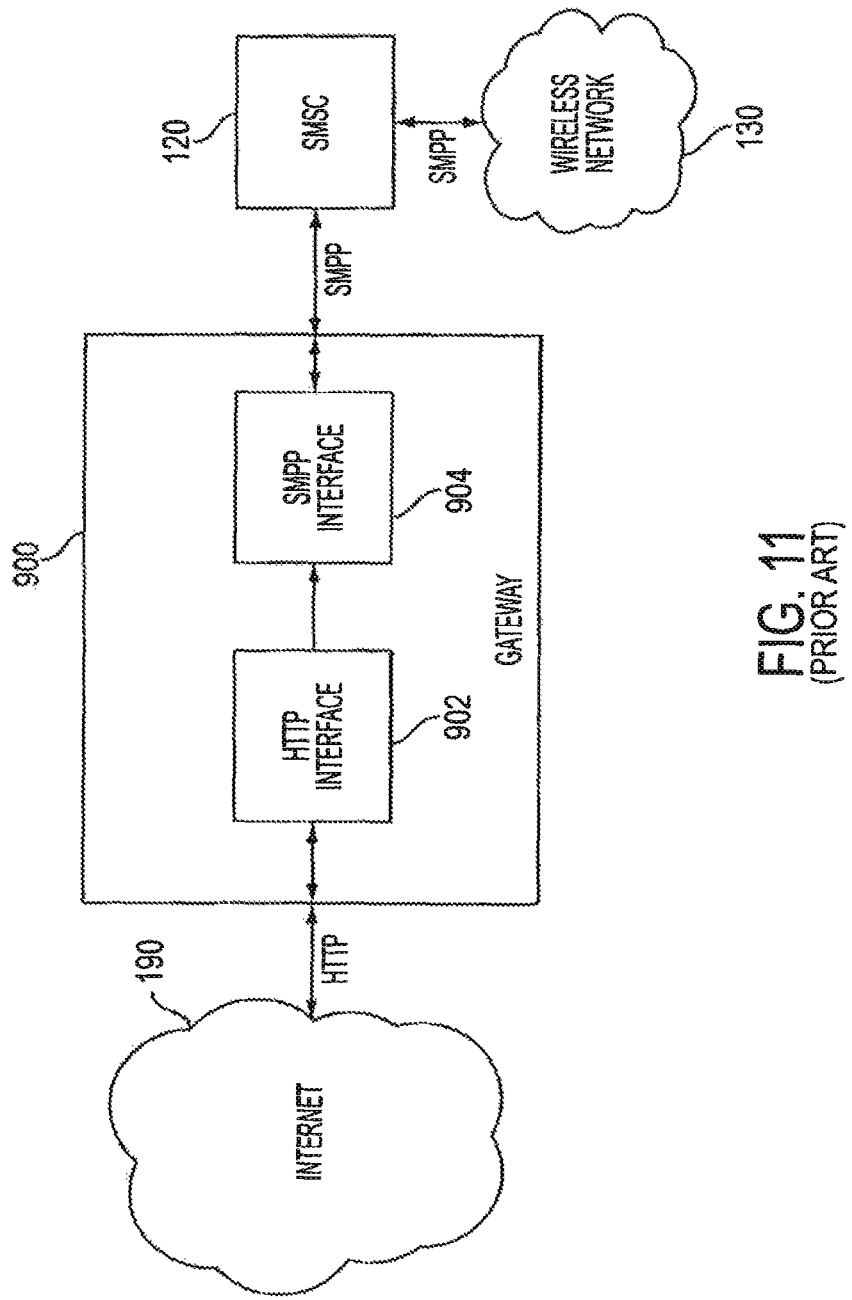
FIG. 11 shows a conventional gateway providing Internet access to a wireless network through a short message service center (SMSC).

FIG. 9C illustrates how messages would flow in an RMI scenario.

In particular, RMI is a bit more complicated, but similar in nature. As shown in FIG. 9C, a Remote2Way object 740 brokers the 'inside' and 'outside' worlds. It ensures that references are cleaned up if the remote client should disconnect or fail. It also helps ensure that the core classes do not worry about RMI details at all. For every remote object that binds through the Remote2Way 740, a local 'proxy' object is created which actually binds to the specified senders and relays messages back and forth through the Remote2Way 740.

As indicated previously, the Registrar 702 is used to facilitate connecting receivers to senders. This can be done by explicitly passing in sender and receiver objects to the registrar 702. However, one can also assign unique identifies to senders and receivers, and then reference either by their ID rather then by the actual object. This latter approach is useful for objects that need to be connected at runtime, as defined by a configuration file 840.

In the above scenario, the Config object 712 assigns an ID to a sender object. A remote app 741 then binds to the wireless Internet gateway's Remote2Way interface 740 and requests to be a listener for the sender with the same given ID. Remote2Way 740 creates a ProxyReceiver 742 for the remote object, and then uses the Registrar 702 to register the proxyReceiver 742 as a listener to the Sender with the specified ID.

When the Sender sends a message, it will be delivered to the proxyReceiver 742, which forwards it to Remote2Way 740, which then goes to the remote object 741. The remote object 741 can then reply with a message, which will be sent via Remote2Way 740 to the ProxyReceiver 742, which will ensure that it gets delivered to the ReturnPath Receiver that was originally specified when the Sender sent the message.

Remote2Way 740 also provides methods for originating new messages directly to senders. So, the remote app 741 can do more than just reply.

A wireless Internet gateway 100 in accordance with the principles of the present invention is particularly useful for wireless carriers and/or Internet service providers (ISPs). For instance, a wireless Internet gateway 100 can also be used within the Enterprise and ISP markets to provide a single point of entry for short message system (SMS) delivery to multiple wireless carriers.

While the invention has been described with reference to the exemplary embodiments thereof, those skilled in the art will be able to make various modifications to the described embodiments of the invention without departing from the true spirit and scope of the invention.

What is claimed is:

1. A method of providing two-way text messaging with a physical wireless Internet gateway server, comprising:
   injecting a text message into a Java Remote Method Invocation (RMI) object;
   passing, via said physical wireless Internet gateway server, said RMI object including said text message to a listener agent associated with a destination mobile device registered therewith, rather than delivered into a message queue associated with said destination mobile device; and
   delivering said RMI object including said text message, together with a return path iMessageReceiver object;
   returning a response to said text message to said return path iMessageReceiver object;
   wherein text messages are received from, and sent to, a wireless device external to the physical wireless internet gateway server, in a protocol independent manner.

2. The method of providing two-way text messaging with a physical wireless Internet gateway server according to claim 1, wherein:
   said text message is delivered using at least three parameters.

3. The method of providing two-way text messaging with a physical wireless Internet gateway server according to claim 2, wherein said at least three parameters include:
   an identity of said return path iMessageReceiver object;
   an identity of a sending mobile device; and
   a body of said text message.

4. The method of providing two-way text messaging with a physical wireless Internet gateway server according to claim 2, wherein said at least three parameters include:
   a message priority level.

5. The method of providing two-way text messaging with a physical wireless Internet gateway server according to claim 2, wherein said at least three parameters include:
   a phone number of an initiating mobile device.

6. The method of providing two-way text messaging with a physical wireless Internet gateway server according to claim 2, wherein said at least three parameters include:
   a validity time relating to said text message.

7. The method of providing two-way text messaging with a physical wireless Internet gateway server according to claim 2, wherein said at least three parameters include:
   a delivery receipt request.

8. The method of providing two-way text messaging with a physical wireless Internet gateway server according to claim 1, further comprising:

logging details about said text message, in a messages database.

9. The method of providing two-way text messaging with a physical wireless Internet gateway server according to claim 1, further comprising:

storing said text message in a message cache.

* * * * *